Oct. 18, 1927.
J. R. GAMMETER
1,645,748
RUBBER COATED ARTICLE AND METHOD OF MAKING THE SAME
Filed Feb. 18, 1925
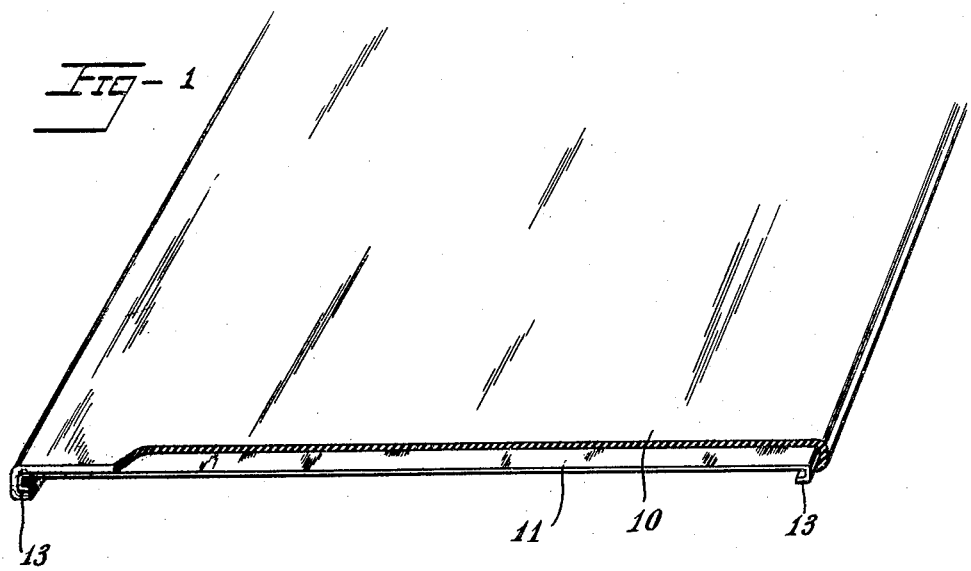
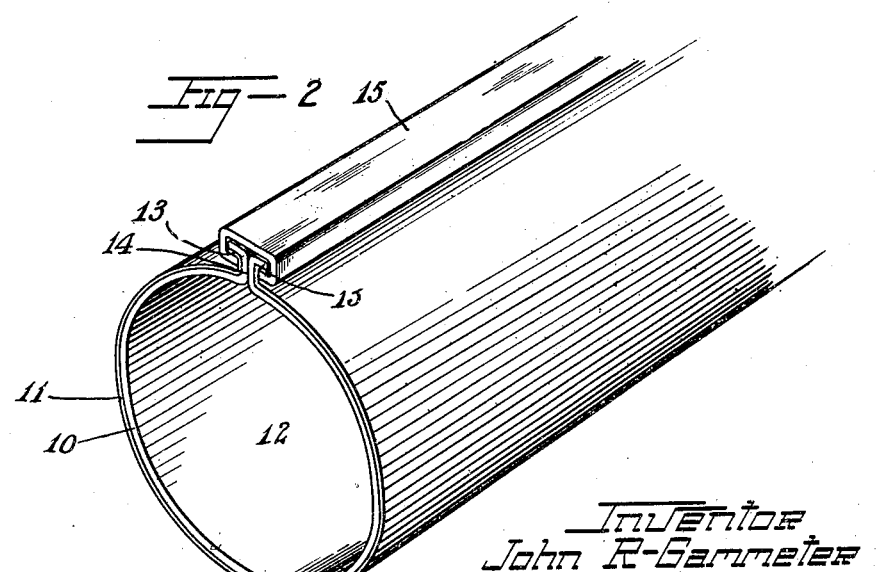
Inventor
John R. Gammeter
By Robert M. Pierson
Atty.

Patented Oct. 18, 1927.

1,645,748

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

RUBBER-COATED ARTICLE AND METHOD OF MAKING THE SAME.

Application filed February 18, 1925. Serial No. 10,041.

This invention relates to rubber coated or rubber lined articles such, for example, as grain and ore chutes and the like, wherein the rubber lining or coating is adapted to resist wear, and conduits and containers wherein a rubber lining is employed, upon a backing of metal, to avoid the action of chemicals, such as acids, upon the metal.

My chief objects are to provide an improved rubber lined or coated conduit or the like comprising a relatively stiff backing such as sheet metal and a facing of rubber thereon, and to provide an improved, convenient and economical method of making the same. A more specific object is to avoid the difficult and imperfect procedure, heretofore commonly employed, of first giving final shape to a metal backing and thereafter applying the rubber facing or lining thereto, which has involved difficulties and imperfections, especially in the case of hollow articles such as conduits and containers and other articles of closed form or of uneven contour.

Of the accompanying drawings:

Fig. 1 is a perspective view of a strip of sheet metal and a layer of rubber vulcanized thereon, representing one stage of my improved method.

Fig. 2 is a perspective view of the finished conduit.

Referring to the drawings, a layer of rubber 10 is applied to one face of a strip of sheet metal 11 and secured thereon by the use of a suitable adhesive or by vulcanization or both, and the metal sheet is then bent, with its rubber covered face inward, into the form of a conduit 12, here shown as being of closed, cylindrical form, although my invention is not wholly limited thereto.

When the conduit is to be of closed form suitable means may be provided for holding the margins of the rubber-lined metal sheet together, and for this purpose the metal sheet is preferably bent back at its margins before the rubber is applied thereto, to provide hooked clamping flanges 13, 13, and the rubber is preferably extended over these flanges as shown so that when the sheet is bent to its final closed form the rubber coverings on the two flanges will contact and seal against each other, as shown at 14, Fig. 2, so that the conduit is effectively lined with rubber throughout its entire circumference.

The flanged margins preferably are held together, with the mutually contacting rubber coverings of the flanges under sufficient compression to insure a continuous seal along the conduit and to avoid relative movement of the flanges, by a metal strip 15, bent to a channeled, nearly closed crosssectional form and driven longitudinally onto the two flanges 13 with its margins interlocking therewith and with its edge faces bearing firmly against the shanks of the flanges. The clamping strip 15 is preferably continuous throughout the length of the conduit section, for strength and for facility of construction, but I do not wholly limit my claims to this feature.

The rubber, being applied to the metal sheet while the rubber-receiving face thereof is exposed, may be progressively applied and rolled in place, so that the pocketing of air may be avoided and improved adhesion obtained, as compared with procedure heretofore employed for applying a rubber lining to a conduit of closed form, and the rubber may conveniently be vulcanized to the metal under mechanical pressure if desired. The subsequent bending of the rubber-covered metal strip to closed form results in placing the inner surface region of the rubber under compression, so that it is given increased resistance to abrasion and to permeation by fluids.

The described construction and procedure are susceptible of modification within the scope of the invention as defined in the appended claims.

I claim:

1. The method of making a rubber-lined hollow article which comprises securing a preformed layer of rubber locally throughout its extent, substantially by adhesion only to the face of a piece of sheet metal and placing said rubber layer under compression by bending the composite sheet to hollow cross-sectional form with its rubber-covered face inwardly exposed.

2. The method of making a rubber-lined hollow article which comprises securing a preformed layer of rubber locally throughout its extent, substantially by adhesion only to the face of a piece of sheet metal, bending the composite piece to closed cross-sectional form with its rubber-covered face inwardly exposed, and securing it in such form.

3. A hollow article comprising a piece of sheet metal bent to hollow form and a previously applied internally exposed, surface lining of rubber therein placed under compression by the bending of said piece, and locally secured to the sheet metal throughout its extent substantially by adhesion only.

4. A hollow article comprising a sheet metal body and an inner facing of rubber thereon, the said body and said facing being bent as a unit to closed form, and clamping means holding them in such form, the facing and the sheet metal body being locally secured to each other by adhesion throughout their extent.

In witness whereof I have hereunto set my hand this 14th day of February, 1925.

JOHN R. GAMMETER.